United States Patent
Wei et al.

(10) Patent No.: US 6,858,125 B2
(45) Date of Patent: Feb. 22, 2005

(54) MULTI-AXIS NUMERICAL CONTROL ELECTROMACHINING OF BLADED DISKS

(75) Inventors: Bin Wei, Mechanicville, NY (US); Roger Etherington, Boxford, MA (US); Michael Lamphere, Hooksett, NH (US)

(73) Assignee: General Electric Company, Niskayuna, NY (US)

( * ) Notice: Subject to any disclaimer, the term of this patent is extended or adjusted under 35 U.S.C. 154(b) by 95 days.

(21) Appl. No.: 10/248,214

(22) Filed: Dec. 27, 2002

(65) Prior Publication Data

US 2004/0124078 A1 Jul. 1, 2004

(51) Int. Cl.$^7$ .............................. C25F 3/14; B23H 7/32; B23H 3/00
(52) U.S. Cl. ...................... 205/652; 205/647; 205/686; 204/224 M
(58) Field of Search .................................. 205/640, 647, 205/652, 686; 204/224 R, 224 M; 219/69.14, 69.15, 69.17

(56) References Cited

U.S. PATENT DOCUMENTS

| | | | | |
|---|---|---|---|---|
| 3,766,029 A | * | 10/1973 | Haggerty | 205/652 |
| 4,101,405 A | * | 7/1978 | Inoue | 204/224 M |
| 4,678,976 A | * | 7/1987 | Inoue | 318/577 |
| 4,772,368 A | * | 9/1988 | Rabian | 205/647 |
| 5,861,608 A | | 1/1999 | Thompson | |
| 6,156,188 A | | 12/2000 | Yang et al. | |
| 2004/0033115 A1 | * | 2/2004 | Sasu et al. | 409/132 |

OTHER PUBLICATIONS

Aerospace Engineering Online, HTTP://www.sac.org/aeromag/techupdate 4–00/14.htm, "Improving engine blisk manufacturing", Frank Bokulich, Aerospace Engineering, Apr. 2000.
U.S. Appl. No. 09/919,055, filed Jul. 31, 2001, Lamphere et al.
U.S. Appl. No. 10/248,215, filed Dec. 27, 2002, Wei et al.
U.S. Appl. No. 10/248,216, filed Dec. 27, 2002, Batzinger et al.

* cited by examiner

*Primary Examiner*—Roy King
*Assistant Examiner*—Harry D Wilkins, III
(74) *Attorney, Agent, or Firm*—Penny A. Clarke; Patrick K. Patnode

(57) ABSTRACT

A multi-axis machine, with numerical control on each axis, is used to drive the tool and workpiece movements necessary to machining complex airfoil geometry. Tooling is typically made of a metal such as brass or other low cost material and rotates during machining. The tooling may be any shape(cylindrical, conical) and size depending on application. A DC power (continuous or pulsed) is used to provide voltage across the tool and workpiece. A medium such as water, de-ionized water, or electrolyte (such as sodium nitrite) is provided between the tool and workpiece. Workpiece metal is removed in a controlled manner by high intensity thermal erosion.

23 Claims, 1 Drawing Sheet

MULTI-AXIS NUMERICAL CONTROL ELECTROMACHINING OF BLADED DISKS

BACKGROUND OF THE INVENTION

The present invention describes Electromachining and more specifically to an NC (Numerically Controlled) arrangement which can be used to machine complex shaped articles such as the airfoils on blisks to a near net shape at a high metal removal rate and with a low tooling cost as compared to turning, milling, EDM (Electro-Discharge Machining) or ECM (Electro-Chemical Machining).

Electromachining is a technique which utilizes the rotating movement of a cylindrical shaped or similar profiled electrode(tapered) about the longitudinal axis with a profiled tip to remove material from a work piece. The kinematics of the machining is analogous to Numerical controlled milling. The electromachining is conducted with a rotating electrode. The tool-electrode is connected to the negative polarity, while the workpiece is connected to the positive polarity of a pulse generator. The pulse on-time may be of sufficiently long periods from hundreds of microseconds to seconds, in some case even long enough to effectively mimic continuous DC current.

A gap between the electrodes allows for the flow of electrolyte. In the electromachining process, it is believed that metal removal is a result of intense, controlled electroerosion.

The electrical erosion can be created by electrical breakdown of the electrolyte and vapor-gas layer produced at the interface between the tool and the workpiece where material is being removed, as well as by instantaneous short-circuits or transient arcs between the electrode and workpiece. Due to electrical erosions on the machining surface, a large number of pits or craters are formed.

Conventional milling is widely used to rough machine blisks (bladed discs). Subsequent machining processes such as ECM may be used for finish machining. For blisks made of difficult to machine alloys such as IN718, the milling process typically has long cycle times, high cutting tool cost, and high equipment cost. Additionally, long tool extensions necessary to reach into the machined pockets coupled with large cutting forces place limits on the rate and accuracy of material removal.

A great deal of effort has been expended in connection with high speed milling techniques that utilize high spindle rotation speed, improved cutting tools, and extremely rigid machines. High speed milling adds significant equipment and tooling costs but has not shown great success in machining blisks made of tough nickel alloys. One reason for the difficulty is the mechanical limitations imposed by a mechanical cutting process. That is to say, a cutting tool having a moderate to high slenderness ratio can only tolerate a small load before tool deflection impacts accuracy of the milled product. Additional loading may break the cutter. Tool deflection also alters the tool's cutting geometry relative to the workpiece, leading to less than optimum performance in terms of tool life and accuracy of the milled product. Mechanical loading is also limited by part deflection and desired accuracies.

There is a need to explore non-mechanical milling processes. Traditional NC EDM milling is a very slow process and it cannot meet the industrial need for high speed machining. This invention aims to achieve high speed through enhanced electroerosion.

SUMMARY OF THE INVENTION

A first aspect of the invention resides in a multi-axis numerically controlled electromachining device comprising: a rotatable tool to induce controlled workpiece metal removal via high intensity, controlled electroerosion; and a numerical control device operatively connected with the tool to control movement of the tool about a plurality of axes to machine complex geometrical configurations.

A second aspect of the invention resides in a method of multi-axis numerically controlled electromachining comprising the steps of: rotating a tool to induce controlled workpiece metal removal via high intensity electro-thermal erosion; and moving the tool about a plurality of axes using a numerical control device operatively connected with the tool to machine complex geometrical configurations. The tool motion is strictly control based on the principle that highest metal erosion can be achieved with minimum workpiece thermal impact and with minimum surface recast layer or heat-affected zone caused by persistent arcing or short-circuiting.

DETAILED DESCRIPTION OF THE PREFERRED EMBODIMENTS

Figure 1:
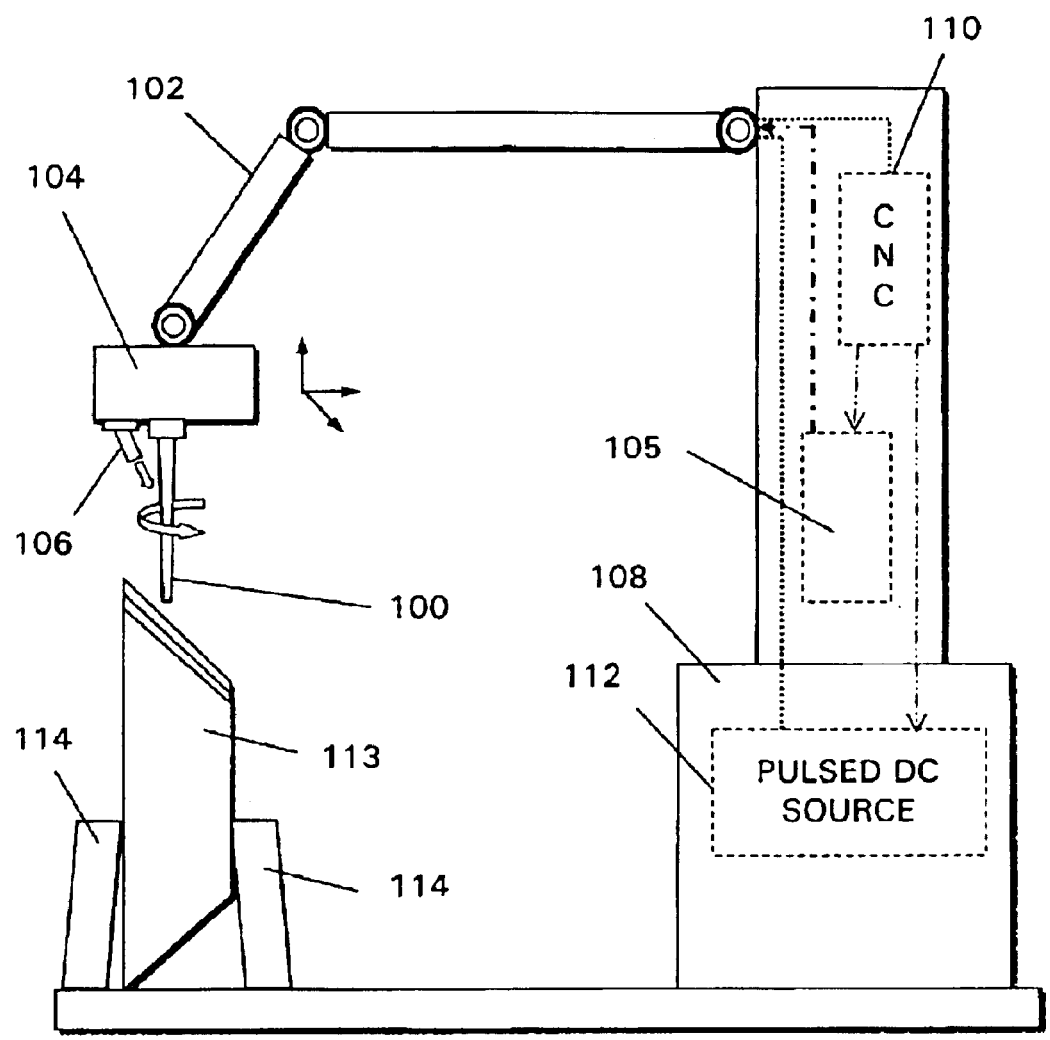
FIG. 1 is a schematic side view of a multi-axis numerically controlled electromachining machine according to an embodiment of the present invention.

The present invention uses a high rate electroerosion in an electrolyte medium, to remove material and generate the desired shape and geometry.

Since non-mechanical means are used to remove and shape the material, low cost tools made of soft metals or any electrically conductive material can be used to significantly lower tooling costs. The workpiece metal removal rate can be increased by intense electrothermal actions, and no significant "cutting forces" are generated so that simple, low rigidity machines can be used that greatly reduce cost. Further, no compensation is necessary for tooling deflection that is common in mechanical milling.

As a non-mechanical process, the electro-machining speed is independent of workpiece material hardness and toughness. Higher metal removal speed than milling for tough workpiece metals can be achieved through high intensity electrothermal reactions.

With the present invention, it is possible to use soft metals as tool electrodes and the electrodes typically have simple geometry. No complex teeth or flutes are needed in tool electrodes. A simple rod or tubing can used as the exemplary tool electrode. There are no significant cutting forces and low rigidity machines can therefore be used. This of course, results in lower costs in terms of cycletime reductions, tooling, and machinery.

In accordance with an embodiment of the invention, a multi-axis machine with numerical control on each axis, is used to drive the tool and workpiece movements necessary to machining complex airfoil geometry. Tooling is typically made of a metal such as brass or other low cost metals and rotates during machining. The tooling may be any shape (e.g. cylindrical, conical) and size depending on the application. DC power (continuous or pulsed) is used to provide voltage across the tool and workpiece. A medium such as tap water of low electrical conductivity, or an electrolyte (such as an aqueous solution of $NaNO_3$, $NaNO_2$, $NaCl$ or soda which functions to provide a weak conductive medium) is provided between the tool and workpiece. Workpiece metal is removed in a controlled manner by high intensity electro thermal erosion. The control system detects machining conditions through monitoring the machining pulse conditions to determine whether short-circuiting or persistent arcing is present. The control regulate tool feed speed and/or pulse intervals to ensure high efficient erosion and minimized arcing or short-circuiting.

That is to say, the servo control system regulates the tool motion relative to workpiece based on electroerosion condition. This includes monitoring the erosion condition and determining whether there is persistent arcing or short-circuiting. Depending on the sensed conditions, tool feed speed can be increased if erosion intensity (as measured by erosion current) is not up to a set the level, or it can be maintained at a constant speed when the erosion intensity reaches the set level. Alternatively, the tool feed speed can be reduced if persistent arcing or short-circuiting is detected.

FIG. 1 is a schematic depiction of an above-mentioned embodiment of the invention. In this arrangement, the cutting or more specifically, the erosion tool 100 is, merely by way of example, depicted as being supported on a robotic type multi-joint motorized arm 102. This motorized arm 102 is adapted to move the tool 100, which is driven to rotate by a motor unit 104, in a least three mutually opposed directions. The tool 100 is supplied electrolyte or other form of fluid from a source of fluid 105 via a nozzle 106.

The motorized arm 102 is supported on a base 108 which includes, in addition to the fluid source 105, a CNC (computerized numerical controller) device 110, which is operatively connected with the motors of the motorized arm 102, and a pulsed DC source 112 which is operatively connected with the tool 100.

The CNC device 110 can be programmed to manipulate the cutting tool 100 in a manner which enables a work piece 113 to be shaped via erosion and so that complex shapes such as those of airfoil blisk blades, can be quickly and economically produced, and also regulate tool feed speed based on the detection of erosion process to avoid persistent arcing or short-circuiting.

In this figure, the work piece 112 is schematically depicted as being a blisk and is shown clamped with clamp members 114, in position adjacent the base 108.

Test have shown that airfoils made of IN718, for example, can be produced using the above described process. These tests have shown that a 2 fold increase in machining speed and an over a six fold tooling cost reduction can be achieved under test conditions using a 4-axis numerical control and a pulse DC power supply.

While this invention has been disclosed with reference to only a limited number of embodiments, the various modifications and variations that can be envisaged and produced by a person of skill in the art to which the invention pertains or most closely pertains, will be self-evident given the proceeding disclosure. The scope of the invention is limited only by the appended claims.

What is claimed is:

1. A multi-axis numerically controlled electromachining device comprising:
    a rotatable tool electrode made of a metal to induce controlled workpiece metal removal via high intensity thermal erosion; and
    a numerical control device operatively connected with the tool to control movement of the tool about a plurality of axes to machine complex geometrical configurations, the numerical control device being configured to:
    control a supply of electrical power to the tool,
    monitor erosion intensity by sensing erosion current, determine if persistent arcing or short-circuiting is occurring between a work piece and the tool, and regulate tool feed speed with respect to the work piece by:
        increasing tool feed speed if the erosion intensity is below a set level, and
        reducing tool feed speed if persistent arcing or short-circuiting is occurring.

2. A multi-axis numerically controlled electromachining device as set forth in claim 1, wherein the tool electrode is an electrically conductive material.

3. A multi-axis numerically controlled electromachining device as set forth in claim 1, wherein the metal is brass.

4. A multi-axis numerically controlled electromachining device as set forth in claim 1, further comprising:
    a DC power source which is used to provide voltage across the tool and workpiece.

5. A multi-axis numerically controlled electromachining device as set forth in claim 4, wherein the DC power source is a continuous DC power source.

6. A multi-axis numerically controlled electromachining device as set forth in claim 4, wherein the DC power source is a pulsed DC power source.

7. A multi-axis numerically controlled electromachining device as set forth in claim 1, wherein the tool has a shape.

8. A multi-axis numerically controlled electromachining device as set forth in claim 7, wherein the shape is cylindrical, with a simple or profiled cuttingtip.

9. A multi-axis numerically controlled electromachining device as set forth in claim 7, wherein the shape is conical, with a simple or profiled cutting tip.

10. A multi-axis numerically controlled electromachining device as set forth in claim 1, further comprising a fluid supply which delivers fluid from a source of fluid to the tool and between the tool and a workpiece.

11. A multi-axis numerically controlled electromachining device as set forth in claim 10, wherein the fluid is selected from one of water and an electrolyte solution of varying types and conductive strengths.

12. A multi-axis numerically controlled electromachining device as set forth in claim 11, wherein the electrolyte is an aqueous solution a salt.

13. A multi-axis numerically controlled electromachining device as set forth in claim 12, wherein the salt is selected from the group consisting of $NaNO_2$, $NaNO_3$, soda, and NaCl.

14. A multi-axis numerically controlled electromachining device as set forth in claim 1, wherein the numerical controlled device is a computer controlled programmable numerical control device.

15. A multi-axis numerically controlled electromachining device as set forth in claim 1, wherein the numerical control device includes a base and a robotic connection between the base and the tool.

16. A multi-axis numerically controlled electromachining device as set forth in claim 15, wherein the robotic connection includes at least one axis configured and is configured to achieve a desired tool motion.

17. A multi-axis numerically controlled electromachining device as set forth in claim 1, wherein the plurality of axes comprises five axes.

18. A method of multi-axis numerically controlled electromachining comprising the steps of:
    rotating a rotatable tool to induce controlled workpiece metal removal via high intensity electro thermal erosion;

moving the tool about a plurality of axes using a numerical control device operatively connected with the tool to machine complex geometrical configurations;

monitoring erosion intensity;

determining if persistent arcing or short-circuiting is occurring; and regulating tool feed speed with respect to a work piece by:
increasing tool feed speed if the erosion intensity is below a set level; and reducing tool feed speed if persistent arcing or short-circuiting is occurring.

19. A method as set forth in claim 18, further comprising the step of supplying DC power to the tool.

20. A method as set forth in claim 18, wherein the step of supplying DC power to the tool comprises supplying DC power from a continuous DC source.

21. A method as set forth in claim 18, wherein the step of supplying DC power to the tool comprises supplying DC power from a pulsed DC source.

22. A method as set forth 18, comprising the step of delivering fluid from a source of fluid to the tool and between the tool and a workpiece.

23. A method as set forth in claim 22, wherein the step of supplying fluid comprises the step of supplying one of water, de-ionized water, or electrolyte.

* * * * *

UNITED STATES PATENT AND TRADEMARK OFFICE
Certificate

Patent No. 6,858,125 B2

Patented: February 22, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bin Wei, Mechanicville, NY (US); Roger Etherington, Boxford, MA (US); Michael Lamphere, Kooksett, NH (US); and Jeffrey F. Wessels, Cincinnati, OH (US).

Signed and Sealed this Twelfth Day of September 2006.

ROY KING
*Supervisory Patent Examiner*
Art Unit 1742